United States Patent
Selvaraj et al.

(10) Patent No.: US 12,430,670 B2
(45) Date of Patent: Sep. 30, 2025

(54) PERSONALIZED INTERNAL SERVICES VIA A PRIVACY-CONSTRAINED CONTENT PROMOTION PLATFORM

(71) Applicant: Oracle International Corporation, Redwood Shores, CA (US)

(72) Inventors: Guru Selvaraj, Madhapur (IN); Kyasaram Vishwa Prasad, Madhapur (IN); Chidambaram Gopal Karthik Murugan, Redwood City, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 18/441,534

(22) Filed: Feb. 14, 2024

(65) Prior Publication Data

US 2025/0259209 A1    Aug. 14, 2025

(51) Int. Cl.
G06Q 30/02      (2023.01)
G06N 20/00      (2019.01)
G06Q 30/0251    (2023.01)

(52) U.S. Cl.
CPC ......... *G06Q 30/0271* (2013.01); *G06N 20/00* (2019.01)

(58) Field of Classification Search
CPC ............... G06Q 30/0271; G06N 20/00
See application file for complete search history.

(56) References Cited

U.S. PATENT DOCUMENTS

| 2007/0055565 A1 | 3/2007 | Baur et al. |
| 2013/0311222 A1 | 11/2013 | Chaturvedi et al. |
| 2018/0285775 A1* | 10/2018 | Bergen ............... G06N 20/00 |

(Continued)

FOREIGN PATENT DOCUMENTS

| JP | 2013004027 A | 1/2013 |
| JP | 2014174916 B | 2/2016 |

OTHER PUBLICATIONS

University of Chicago, "Too Many Metrics" (Year: 2016).*

(Continued)

*Primary Examiner* — Breffni Baggot
(74) *Attorney, Agent, or Firm* — Mughal Gaudry & Franklin PC

(57) ABSTRACT

Techniques are described for providing personalized content in applications without revealing personal details to content providers. A base machine learning model is loaded to a cloud environment that is private to a tenant organization. The base machine learning model is used to generate a custom machine learning model specific to the tenant organization based on user interactions within the tenant organization and content categories specific to the tenant organization. The custom machine learning model is used to select content categories for which to provide instances of content items to users based on user interactions with applications. Engagement with the instances of content items is tracked in a user-specific manner privately by the tenant organization, in a tenant-specific manner privately by a cloud services provider, and in a content-specific manner by the content provider. Feedback is provided to the custom machine learning model based on engagement with instances of content items.

26 Claims, 7 Drawing Sheets

(56) References Cited

U.S. PATENT DOCUMENTS

2021/0150483 A1* 5/2021 Carlberg .................. G09B 7/02

OTHER PUBLICATIONS

Exo, "Digital Workplace Platform, Open-source, user-friendly and secure", retrieved online via https://www.exoplatform.com, Sep. 14, 2023, 10 pages.

hubengage.com, "Create a fun culture with an enterprise Social NetworkSocial Network platform", Top Employee Social Platform—2022, 5 pages.

Kapasi, Z., "HubEngage's All-In-One SaaS Platform for Employee Communications, Recognition, Feedback Helps Organizations Drive Engagement and Retention in a Competitive Jobs Market", https://shorturl.at/ruGIX, Mar. 17, 2022, 18 pages.

Kapasi, Z., "Top Employee Engagement Companies", HubEngage, retrieved online via: https://www.hubengage.com/employee-engagement/top-employee-engagement-companies/, Sep. 14, 2023, 10 pages.

Mangoapps, "Connect, Engage and Digitize Your Enterprise", retrieved online via: https://www.mangoapps.com, Sep. 14, 2023, 7 pages.

Mangoapps, "Transform Internal Operations with Our Frontline SuperApp", retrieved online via: https//www.mangoapps.com/employee-superapp, Sep. 14, 2023, 17 pages.

Microsoft Learn, "Overview of Viva Connections", Aug. 23, 2023, https://learn.microsoft.com/en-us/viva/connections/vivia-connections-overview, 17 pages.

Microsoft Viva, "The 2023 Microsoft Work Trend Index Annual Report: Will AI Fix Work?", https://www.microsoft.com/en-in/microsoft-viva, Sep. 14, 2023, 8 pages.

sprinklr.com, "The only unified omnichannel platform for the end-to-end marketing lifecycle", Sprinkler Marketing: AI-Powered Marketing & Advertising Platform, Sep. 14, 2023, 18 pages.

sprinklr.com, "What is Unified-CXM?" https://www.sprinklr.com/unified-cxm/, Sep. 14, 2023, 10 pages.

workplace.com, "A simpler way to stay connected", retrieved online via https://en-gb.workplace.com/features (2023).

workplace.com, "Trust and Security", retrieved online via https://www.workplace.com/security?locale=en_US (2023).

workplace.com, "Welcome to Workplace", retrieved online via https://en-gb.workplace.com (2023).

workplace.com, "Workplace Groups", retrieved online via https://en-gb.workplace.com/features/groups (2023).

workplace.com, "Workplace News Feed", retrieved online via https://en-gb.workplace.com/features/news-feed (2023).

workplace.com, "Workplace Solutions", retrieved online via https://en-gb.workplace.com/solutions (2023).

* cited by examiner

Acme Marathon Team In San Francisco
402

Check out this running apparel!
404     406

Races 408   Challenges 410   Race Weekend 412   FAQ 414   Register Now!! 416

Click To Connect With Other Acme Employees Running The Marathon
418

500

Acme
502

Click To View Details About Your Upcoming Flight To New York ✈
504

Restaurants - NY
508

Click To View
Famous Places To
Eat In New York

Big Bus Tours - NY
510

Big Bus Tours
Available – Visit
Famous Places
In New York

Employee Connect
512

Click To Connect
With Friends At
Acme Traveling
To New York

FIG. 5

PERSONALIZED INTERNAL SERVICES VIA A PRIVACY-CONSTRAINED CONTENT PROMOTION PLATFORM

BACKGROUND

Companies offer personalized promotional content on websites and other media by tracking which user is visiting their web site, what the user has done in the past on their website and various other websites, and tailoring content based on the user's past activity on the websites. Such content may be tracked by storing, in a server-accessible repository, device information from the request for information from the website, and matching, in the server-accessible repository, that device information with other device information used in requests for other websites. Another way to track information is to store cookies in a browser of the user, where different websites have access to the stored cookies. Such targeted promotional content leaves users feeling hopeless about privacy when browsing websites, and companies utilize this strategy to target users that are most likely to spend the most money on their products and services.

Targeted promotional content is so powerful that companies pay significant amounts to place promotional content on various venues to reach various targeted audiences, with much success. Popular venues include Meta's Facebook®, Instagram®, and Threads®, Twitter®, Alphabet's YouTube®, Alphabet's Google®, Microsoft's Bing®, etc. In most scenarios, the provider of the venue gets paid to place targeted advertisements.

Due to the negative sentiment about targeted advertisements, many companies choose for the sake of their own employees to avoid placing targeted advertisements on their company-internal tools. This way, employees can interact with these company-internal tools to perform productive tasks without being watched by other companies and without being pulled away from their tasks at hand. Most tools used by large enterprises are therefore free of promotional content, unless the tool provider (e.g., Meta's Facebook®, Instagram®, and Threads®, Twitter®, Alphabet's YouTube®, Alphabet's Google®, Microsoft's Bing®) does not provide an option to disable all forms of promotional content. Even if, as on YouTube®, users can toggle interrupting promotional content on or off with a paid subscription, the users' online activity is still being tracked and stored by the venue provider, to personalize search results, and for use by the venue provider to sell content targeting opportunities in other forms, such as targeting users with certain interests or characteristics via web search and email. As a result, some companies have banned the use of even free versions of these tools during employee hours on company equipment.

BRIEF SUMMARY

In some embodiments, a computer-implemented method includes providing personalized content in applications without revealing personal details to content providers. A base machine learning model is loaded to a cloud environment that is private to a tenant organization. The base machine learning model is used to generate a custom machine learning model specific to the tenant organization based on user interactions within the tenant organization and content categories specific to the tenant organization. The custom machine learning model is used to select content categories for which to provide instances of content items to users based on user interactions with applications. Engagement with the instances of content items is tracked in a user-specific manner privately by the tenant organization, in a tenant-specific manner privately by a cloud services provider, and in a content-specific manner by the content provider. Feedback is provided to the custom machine learning model based on engagement with instances of content items.

In one embodiment, a computer-implemented method loads a base machine learning model to a cloud environment that is private to a tenant organization. The method generates a custom machine learning model specific to the tenant organization at least in part by training the base machine learning model in the cloud environment that is private to the tenant organization. The base machine learning model is trained to match user interactions of users with one or more applications in the cloud environment to content categories of a plurality of content categories of content provided by one or more content providers outside the tenant organization. The method then uses the custom machine learning model to select the content categories for which to provide instances of content items to the users based on the user interactions. A particular content category is selected based at least in part on processing, by the custom machine learning model, natural language from a particular user interaction of a particular user with a particular application. The method selects a particular instance of a particular content item to provide to the particular user based at least in part on the particular content category. Based at least in part on detecting an engagement with the particular content item by the particular user, the method includes triggering storage of a private indication of the engagement specific to the particular user and in association with a particular tracking identifier. The private indication is accessible to the tenant organization but not to the one or more content providers outside the tenant organization. Based at least in part on the private indication, the method generates, for the particular user, a user preference for the particular content category. The user preference is stored for use by the custom machine learning model in one or more additional iterations of selecting content categories based on user interactions with the one or more applications in the cloud environment.

In one embodiment, the method further triggers storage of an opaque association between tracking identifiers and a cloud services provider hosting the one or more applications in the cloud environment. The opaque association is accessible to a particular content provider of the particular content item, and the particular content provider is outside the tenant organization. Based at least in part on detecting an engagement with the particular content item by the particular user, the method further triggers storage of an opaque indication of the engagement specific to the cloud services provider and in association with the particular tracking identifier. The opaque indication is accessible to the particular content provider outside the tenant organization.

In a further embodiment, the method includes, based at least in part on the opaque indication of the engagement specific to the cloud services provider, triggering: a first automated asset transfer from the particular content provider to the cloud services provider, and a first automated communication from the particular content provider to the cloud services provider that associates the first automated asset transfer with the particular tracking identifier. Based at least in part on the first automated communication from the particular content provider to the cloud services provider, the method includes triggering: a second automated asset transfer from the cloud services provider to the tenant organization, and a second automated communication from the cloud services provider to the tenant organization that associates the second automated asset transfer with the particular tracking identifier.

In yet a further embodiment, the method includes, based at least in part on the second automated communication from the particular content provider to the cloud services provider, triggering: a third automated asset transfer from the tenant organization to the particular user, and a third automated communication from the tenant organization to the particular user that associates the third automated asset transfer with user activity relating to the particular application.

In one embodiment, the base machine learning model is a base large language model that is trained outside the cloud environment based at least in part on: prompts that provide first natural language inputs and a set of global content categories for content available to the tenant organization and one or more other tenant organizations, and feedback on categorizing the first natural language inputs to one or more content categories of the set of global content categories. The custom machine learning model is a custom large language model that is trained within the cloud environment based at least in part on: prompts that provide second natural language inputs and the plurality of content categories, and feedback on categorizing the second natural language inputs to one or more content categories of the plurality of content categories.

In one embodiment, the method further includes receiving content configuration input from the particular user. The content configuration input opts in to receiving content promoted by the one or more content providers. The natural language from the particular user interaction with the particular application is provided to the custom machine learning model based at least in part on the content configuration input opting in to receiving content promoted by the one or more content providers.

In one embodiment, the method includes receiving location preference information from a plurality of users. The location preference information indicates that one or more users of the plurality of users prefer a particular location featured in the particular instance of the particular content item. The method includes enriching the particular instance of the particular content item with information about at least one of the one or more users that prefer the particular location featured in the particular instance of the particular content item. Then, the method causes display of the enriched particular instance of the particular content item to the particular user.

In various aspects, a system is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 5 illustrates a diagram of another user interface for a tenant organization's cloud application that provides targeted content without revealing user-specific information to the content provider.

DETAILED DESCRIPTION

Figure 1:
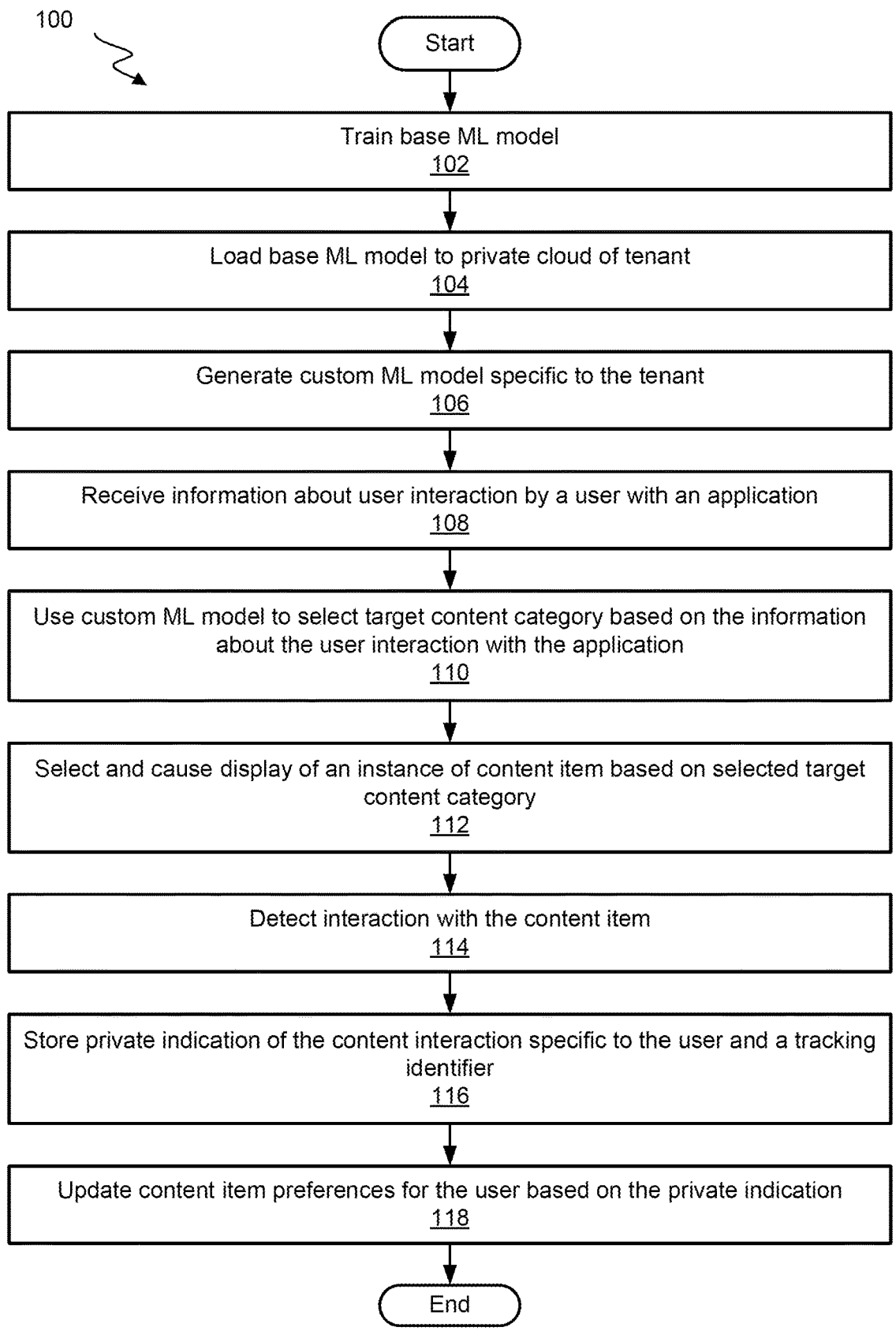
FIG. 1 illustrates a flow chart of a process for providing targeted content without revealing user-specific information to the content provider.

Reduced version of abstract. In various embodiments, a tenant computer system provides personalized content in applications without revealing personal details to content providers. A custom machine learning model specific to the tenant organization is used to select content categories for which to provide instances of content items to users based on user interactions with applications. Engagement with the instances of content items is tracked in a user-specific manner privately by the tenant organization, in a tenant-specific manner privately by a cloud services provider, and in a content-specific manner by the content provider. Processes are described herein performed by the tenant computer system, by an online services provider computer system, and/or by a content provider computer system. These computer systems may store instructions for performing the processes and may perform separate, independent processes, or may work together in a distributed manner to perform an end-to-end process of content delivery, tracking, and asset transfer. The computer system may use non-transitory computer-readable storage media to store instructions which, when executed by one or more processors of a computer system, cause performance of the processes described herein and a possible display of content, content configuration, and asset management information on various user interfaces.

A description of providing personalized content in applications without revealing personal details to content providers is provided in the following sections:

APPLICATIONS PROVIDED BY CLOUD PROVIDER
PRIVATE DATA CLOUD PLATFORM FOR TENANT-INTERNAL USERS
OPAQUE PRIVACY-PRESERVING CONTENT PROMOTION PLATFORM
BASE AND CUSTOM MODELS FOR ANALYZING USER ACTIONS
INTELLIGENTLY SELECTING CONTENT FOR USERS
PERSONALIZED CONTENT DELIVERY THROUGH OPAQUE PRIVACY PRESERVING CONTENT PROMOTION PLATFORM
DETECTING ENGAGEMENT WITH CONTENT
TRANSFERRING ASSETS TO INTERNAL INDIVIDUALS FROM A CONTENT PROVIDER WITHOUT REVEALING IDENTITIES OF THE INTERNAL INDIVIDUALS
COMPUTER SYSTEM ARCHITECTURE

The steps described in individual sections may be started or completed in any order that supplies the information used as the steps are carried out. As used herein, terms such as "first" and "second" are used as naming conventions to separately refer to two instances of a similarly named item. The naming conventions are not intended to imply order unless explicitly stated otherwise. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Applications Provided by Cloud Provider

In various embodiments, a cloud services provider may provide one or more applications to one or more tenant companies, agencies, or other organizations as the organizations use various cloud providers to add software-driven functionality to various processes, responsibilities, asset management, or data management aspects of their organization. The one or more applications may include enterprise resource planning applications, supply chain & manufacturing applications, customer experience applications, human capital management applications, and/or industry-specific applications for automotive, communications, construction and engineering, consumer packaged goods, education, energy and water, financial services, food and beverage, government, healthcare, high technology, hospitality, industrial manufacturing, life sciences, media and entertainment, oil and gas, professional services, public safety, retail, travel and transportation, and wholesale distribution. Such applications may be used by the organization to promote productivity of members of the organization and efficiency of managing data and accomplishing tasks that help the organization operate effectively.

The applications may run certain processes within the tenant organization privately without access by the cloud services provider and other processes within a public cloud of the cloud services provider. The applications may use on-premise hardware and software managed by the tenant organization, which may be cloud-based or local to individual machines. The applications may also use cloud-based hardware and software hosted and managed by the cloud services provider for the benefit of multiple tenants. Although various techniques described herein refer to some aspects of application functionality that are implemented within and private to the tenant organization's private cloud, such as the tracking of user-specific content engagement data, other aspects of application functionality may be implemented by the cloud services provider, by content providers, or otherwise outside of the tenant organization's private cloud.

Applications provided by cloud services providers often include user interfaces that allow members of the organization to input data relating to the organization, or the organization's customers, products, services, or resources. Many user interfaces include a navigation menu for navigating between different application modes or sub-interfaces that offer different functionalities, and an action space for performing actions offered in the current application mode or sub-interface.

Many cloud services providers provide services in the form of applications on a subscription-based model. In a subscription-based model, the organization pays a subscription for some or all of the organization's members to access some or all of the application services for a given term. During the given term, the cloud services provider provides the services covered by the subscription to members of the organization through applications used from members' devices, such as desktop computers, laptops, mobile devices, wearable devices, etc. If the subscription is not renewed, the cloud services provider may freeze or disable the cloud services to the members until a subscription is in place to access the cloud services.

According to techniques described herein, an application may also include an explicit region for promoting content such as products, services, or events of other organizations, or a data output region for implicitly including, as part of data requested from the application pursuant to the task being performed using the application, suggestions of promotional content such as products, services, or events of other organizations. This promotional content may be offered by other organizations or providers of the promotional content for the mutual benefit of the organization and the other organizations. For example, employees seeking company apparel may be directed to other organizations that make apparel for various companies, and members of a conference wanting to meet up for drinks may be directed to an establishment that provides drinks near the conference.

In one embodiment, the application provides travel-related services for employees who are traveling. The travel-related services may help connect employees with other employees who are local to the traveled-to region, or may help connect employees who are traveling to the same region at overlapping times. The travel-related services may also help employees book stays at the same hotels, eat at the same restaurants, and take advantage of the same local services and resources in the region where they are visiting. The travel-related services may include offering discounts at local establishments for employees who are in the region, or providing a list of corporate-approved vendors for hotel stays, restaurants, and other services in the region. In one embodiment, the travel-related services may be used by employees of the same company attending a company-wide event, or by attendees of a same conference event who potentially work for different companies.

In one embodiment, the application is a social application for connecting people at the same organization to each other. For example, the social application may include social groups organized around certain interests, posted local and virtual activities, and feeds of media and textual content posted by members. Additional content may be included in the message feed to suggest outings or establishments based on the flow of the discussion detected. Members of the organization may tag other members of the organization in posted content, to facilitate collaboration and a social experience. Additional promotional content may be posted for the consumption of any users that can see a given feed, or as direct messages to users, and interaction with the additional content may be tracked within the social application as maintained by the organization.

Private Data Cloud Platform for Tenant-Internal Users

A tenant organization may maintain a private data cloud platform for tenant-internal users or other members of the organization. Example tenant organizations and their members include, but are not limited to, companies and their employees, agencies and their agents, conferences and their participants, social media groups and their members, and subscribers and their subscription seats, etc. The private data cloud platform tracks activities of the members across one or more applications and/or one or more user devices supported by one or more cloud providers, such that the application user interfaces, navigation menus, and content provided through the one or more applications may be customized for individual members of the organization. Navigation shortcuts may be provided for navigation pathways in the application or to functionality or sub-interfaces of the application that are frequently used. Additionally or alternatively, the private data cloud platform may maintain data about user interactions with content provided through the applications so content similar to frequently used content, such as content in the same category as frequently used content and/or different categories than infrequently used content, may be more frequently displayed than content similar to infrequently used content, such as content in the same category as infrequently used content and/or different categories than frequently used content.

The private data cloud may also contain other user-specific data beyond the content that may be of interest to a given user. For example, the private data cloud may include the user's email address, phone number, zip code, work address, hotel or travel information, budget, approved vendors, friends or frequent contacts, co-workers on the same team, job title, job description, etc., and this information may be used to help select content for consumption by the user.

The tenant organization's private data cloud is maintained privately to the organization such that outside content providers do not have direct access to the private content maintained in the private data cloud. The cloud services providers offering applications might also be blocked from accessing the private content maintained in the private data cloud, even if a cloud services provider provides the software to maintain such a private data cloud. The private data may be encrypted and secured behind authentication keys, certificates, and/or passwords maintained within the organization's private cloud in a manner that is inaccessible to the cloud services providers and/or the promotional content providers. In this manner, the organization may customize application experiences for the organization's members without revealing internal preferences to the cloud services providers and/or the promotional content providers.

The private data cloud includes a plurality of profiles of a plurality of users of an organization, where the profiles may include information based on a user's history in using cloud application(s), including inputs provided, tasks performed, and/or content for which engagement was detected, a user's history of engaging with content outside of the cloud application(s), a user's history of engaging with other users, and/or a user's self-expressed or otherwise manually assigned interests. The interests may be probabilistic in nature, such that a user occasionally engaging in promoted running events may have a medium interest in running marked by a medium probability score for content marked with the running interest, as compared to a user that almost always engages in promoted running events having a high interest in running marked by a high probability score for content marked with the running interest. These interests and scores for each user may be consumed by content provision services to predict content that will most likely receive engagement from the user.

Opaque Privacy-Preserving Content Promotion Platform

Figure 3:
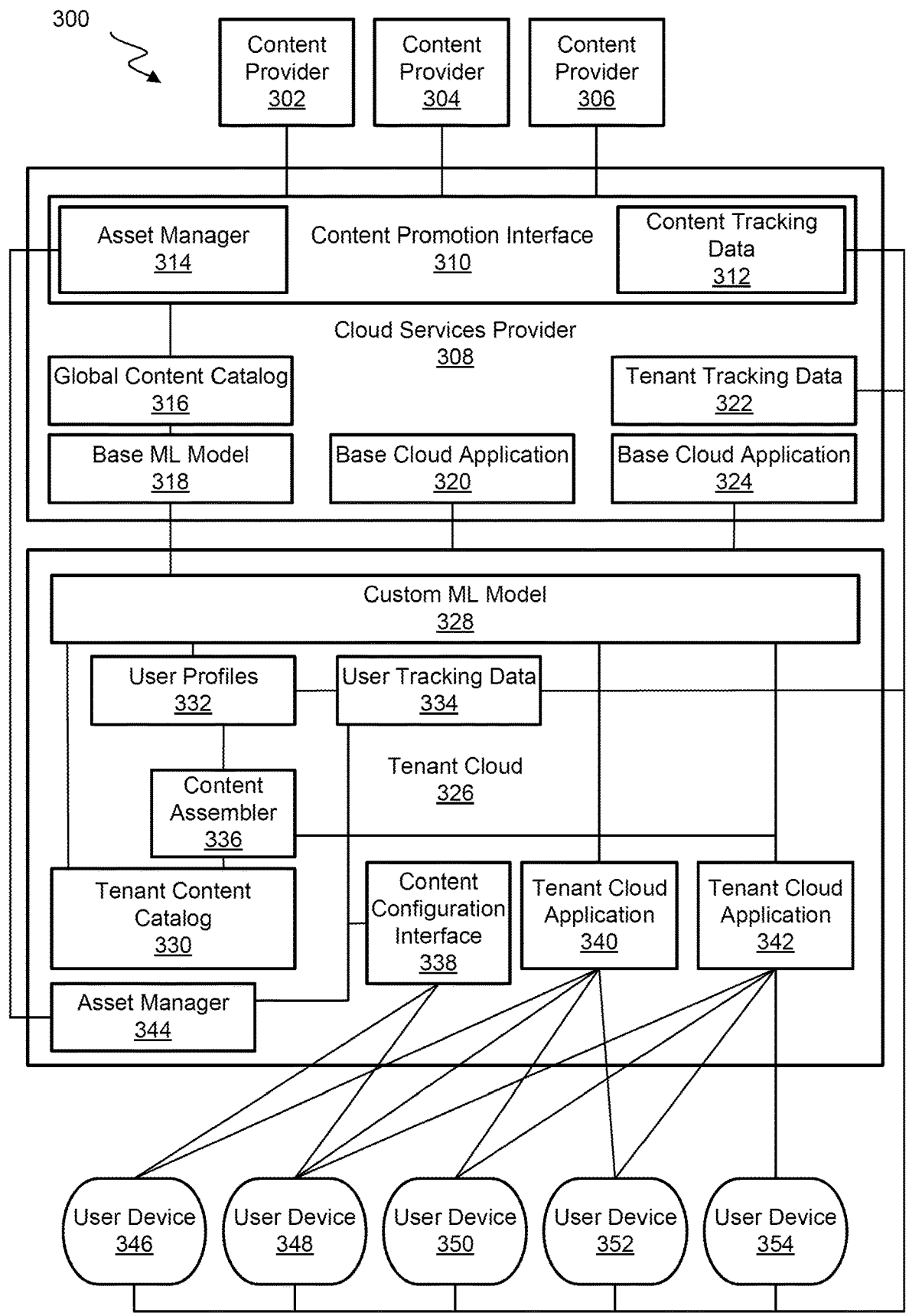
FIG. 3 illustrates a system diagram of a system for providing targeted content without revealing user-specific information to the content provider.

FIG. 3 shows a system diagram of a system 300 for providing targeted content without revealing user-specific information to the content provider. In the example shown, cloud services provider 308 provides content promotion interface 310 to content providers 302, 304, and 306. The content promotion interface provides an opaque privacy-preserving content promotion platform where content providers can provide content while knowing whether the content is being consumed but without knowing the identity of who is consuming the content. Information about content consumption is stored as content tracking data 312, and asset manager 314 is used to manage and coordinate payment for content provided by the corresponding content provider for inclusion in global content catalog 316.

A content provider may register, via the content promotion platform, for content to be included in the catalog of content of the cloud services provider. The content, such as images, video, text, or other media, may be loaded by the content provider via content promotion interface 310. Global content catalog 316 may contain content provided by different content providers 302, 304, and 306, and the different content providers may or may not be able to see each other's content. In one embodiment, via the content promotion interface 310, each content provider can see only the content that individual content provider has uploaded and not the content from other content providers.

The content may be registered in association with different content categories, to promote accurate content targeting. Alternatively, such categories may be automatically determined based on the content provided. For example, a large language model may classify text and/or images of the incoming content in an available content category or a new content category.

The catalog of content may be used in application services offered by the cloud services provider. As part of adding content to the catalog, the content provider may agree to compensate the cloud services provider for content delivered with the application services, for example, per view or per impression.

The views or impressions of content may be tracked using a tracking pixel or specific to the cloud services provider, possibly without any identification of any tenant organizations that use the cloud services provider or any members of those organizations. In this manner, even with a tracking pixel marking a machine of a user viewing content provided from the catalog, the content provider would not be able to distinguish the machine or the user from other machines and other users across all organizations supported by the cloud services provider. The tracking pixel merely maps the content viewing to the cloud services provider. In other words, the content promotion platform of the cloud services provider keeps the identity of the user opaque from the content provider.

In one embodiment, the identity of the user is opaque to even the cloud services provider, as the tenant organization maintains a private mapping of unique user identifiers to unique tracking pixels or content instance identifiers. The cloud services provider, in turn, maintains or otherwise has access to a mapping of unique tenant organizations to unique tracking pixels or content instance identifiers. Similarly, the content provider maintains or otherwise has access to a mapping of one or more unique cloud services providers to unique tracking pixels or content instance identifiers.

A tenant company, agency, or other organization may opt in to receive promoted content while using applications services provided by the cloud services provider. As part of the tenant organization opting in, the cloud services provider may, in turn, agree to compensate the tenant organization using the application services, for example, per view or per impression of a member of the tenant, and/or compensate individual users, employees, agents, or other members of the tenant organization that are exposed to content delivered within the application services, for example, per view or per impression of the individual member. The cloud services provider may use a same or different tracking pixel as the content provider, and the tracking pixel may provide a unique identifier that is mapped, in a mapping maintained privately by the cloud services provider, to the tenant organization that viewed the content.

In one embodiment, the cloud services provider does not have access to a mapping between the tracking pixel identifiers and individual users of the tenant organization. In this manner, the identity of the individual user of the organization may be kept opaque even from the cloud services provider maintaining the content promotion platform. In one embodiment, the tenant organization maintains a mapping between tracking pixel identifiers and individual users of the tenant organization. Content provided to an individual user is marked with a link using a tracking pixel based on a given identifier, and, if the individual user follows the link, the tracking pixel may trigger a notification to the tenant organization passed along from the cloud services provider, the content provider, or the tracking pixel itself that a user associated with the given identifier has visited the link. The content provider may store an indication that the cloud services provider is credited with a view, and the cloud services provider, in turn, stores an indication that the tenant organization is credited with a view. If the tenant organization is tracking views of individual users, the tenant organization may, in turn, store an indication that the individual user of the tenant organization is credited with a view. In this manner, the content provider may pay for views to the cloud services provider without knowledge of individual tenant organizations, and the cloud services provider may pay for views to the tenant organizations without knowledge of individual members of the tenant organizations. Yet, at the same time, individual members of the tenant organizations may receive payment for the individual view as passed along from the content provider to the cloud services provider, from the cloud services provider to the tenant organization, and from the tenant organization to the individual member of the tenant organization.

In one embodiment, the tenant organization may use a promotional content catalog provided by the cloud services provider, may modify the promotional content catalog by adding or removing content items from the catalog, or may supply a tenant-specific promotional content catalog. In the tenant-specific promotional content catalog or as tenant-specific items added to the cloud services provider's promotional content catalog, items such as specific events and specific organization-wide or group-wide meetups may be added even if there is no agreement between the cloud services provider and the content provider to show the content. Such content may not be tracked at all or may be tracked only by the tenant organization without knowledge by the cloud services provider and/or the paying promotional content providers that the content is being offered or even exists. For example, an organization may instruct their employees to meet up at a lobby of a specific hotel, with a link to the hotel's homepage or to a map of the hotel, without consulting with the hotel as a content provider. In this embodiment, as the hotel is not promoting the content, the hotel may not be providing any specific incentive to the company or the company's employees to place the content in the catalog. In other embodiments where a content provider is promoting content that is placed in a catalog, the content provider may pay the company for views of or other engagement with the promoted content, optionally through the cloud services provider to preserve anonymity.

In various examples and embodiments described herein, instances of content items are provided to or shown to users for review. As used herein, an "instance" of a content item is a version of the content item which may be an exact copy of the content item or may include personalized or embedded information. For example, the personalized or embedded information may include a tracking pixel placed in the content item such that, when the tracking pixel is loaded as part of the content item, the tracking pixel triggers a script that informs a server (e.g., a server of the content provider, of the online services provider, and/or of the tenant organization) that the content item has been viewed and/or further engaged with. In one embodiment, the tracking pixel is already embedded by the content provider, which may provide a plurality of instances of the content item ready for consumption. In another embodiment, the tracking pixel is embedded as an instance of the content item is prepared for viewing. Other personalization may also be added as the content item is prepared for viewing, such as references to other users who are likely to engage with the content item or visit an event or location being promoted by the content item.

A single base content item may be instantiated multiple times with different tracking pixels using different identifiers that are specific to the instance of the content item. This allows content providers, online service providers, and tenant organizations to keep track of activity in relation to the content. In the same or a different embodiment, a single base content item may be instantiated multiple times with different personalized content depending on a context in which the content item is being viewed. For example, the tenant organization may embed content specific to the user or connections of the user by enriching the instance of the content item with such information without sharing such information with the content provider. In this manner, a tenant organization may highlight other users of the tenant organization, or even of other tenant organizations if such information has been shared, that have shown an interest in the content, engaged with the content, registered for an event, or are in an area relevant to the content.

Base and Custom Models for Analyzing User Actions

FIG. 1 shows a process 100 for providing targeted content without revealing user-specific information to the content provider. Process 100 begins at block 102, where a base ML model is trained, for example, in a cloud environment managed by a cloud services provider. In block 104, the base ML model is loaded to a private cloud of a tenant. There, in block 106, a custom ML model is generated specific to the tenant. In block 108, the tenant cloud receives information about user interaction by a user with an application. For example, the application may send the information about the user interaction to an interaction handler, which determines whether and where to pass along the information within the tenant cloud. The cloud application or interaction handler may pass that information to the custom ML model in block 110, where the custom ML model is used to select a target content category based on the information about the user interaction with the application. In block 112, a content assembler may select and cause display of an instance of a content item based on the selected target content category from the custom ML model.

Content items displayed to users according to blocks 108-112 may be interacted with or otherwise engaged with by the users, and these interactions may be logged to improve matching user interactions to content, and selecting and assembling content in the future. In block 114, an interaction is detected with the content item. Then, in block 116, the tenant cloud system stores a private indication of the content interaction specific to the user and a tracking identifier, such as a tracking identifier that was embedded and loaded upon interaction with the content item. In block 118, the tenant cloud system updates content item preferences for the user based on the private indication.

Referring back to FIG. 3, cloud services provider 308 may use global content catalog 316 to build a base ML model 318 for use in categorizing user interactions into content categories. Base ML model 318 may be loaded into tenant cloud 326 as custom ML model 328, which is trained on user interactions with tenant cloud applications 340 and 342, based on information in user profiles 332 that account for user tracking data 334.

Custom ML model 328 uses interactions from user devices 346, 348, 350, 352, and 354 with cloud applications 340 and 342 to predict content categories from tenant content catalog 330 for each of the user interactions. The predicted content categories are fed into content assembler 336 to prepare instances of content items to be provided in tenant cloud applications 340 and 342, based on or in response to each of the interactions.

In one embodiment, a base large language model (LLM) or other machine learning (ML) model may loaded into a private cloud environment of an individual tenant organization. The base model may be appropriate for categorizing text into a variety of different categories, as trained by the cloud services provider to be appropriate for a variety of tenants. Before moving the base model to the private cloud environment, the base model may be initially trained on the specific categories available in the catalog made available to all tenants (default catalog categories) in an environment hosted by the cloud services provider. These default catalog categories may be provided as metadata to the base model as training data inputs from a variety of cloud applications are fed into the base model during an initial training phase and ranked by testers of the base model. Then, the base model may be copied into the private customer cloud environment, along with any computing resources from which the base model depends. In another embodiment, the base model is trained on more general natural language data and later customized with category-specific data in the tenant organization's private cloud.

After moving the base model to the private cloud environment of the tenant organization, the base model may then be trained on inputs into cloud applications in use by users of the tenant organization to match those inputs to available categories specifically for the tenant organization. The specific categories available in the catalog for the tenant organization may be provided as metadata to the custom model, which may predict which of the specific categories is mapped to the user interaction input.

In one embodiment, a custom ML model in the tenant organization is trained from the base ML model by matching user interactions of users with application(s) in the cloud environment to content categories provided by content provider(s) outside the tenant organization. The training may be supervised, semi-supervised, or self-supervised. Labeled items may be provided by human reviewers, and/or feedback may be gathered based on whether selected categories of content are frequently selected or not by users. If the selected categories of content are not frequently selected by users, the custom ML model may decrease weights of these categories in future selections. On the other hand, if the selected categories of content are frequently selected by users, the custom ML model may increase weights of these categories in future selections. A set of categories and their corresponding frequencies of use or engagement by users may be provided to the custom ML model periodically or with each request. The custom ML model or a post-processing tool may also evaluate outputs made by the custom ML model, verifying that the outputs are valid categories from the list of categories.

The custom ML model may be used to select the content categories for which to provide instances of content items to the users based on the user interactions. For example, a given natural language input from a user interaction with an application may be matched, by the custom ML model, to an output content category. The output content category may be selected based on key terms in the natural language input, embeddings of the sentence structure and relationships between sections in the natural language input, the location of terms from the input in an ontology of terms, mappings between the ontology of terms and a set of available categories, user engagement metrics for categories of the set of categories, and/or labeled samples of categorized natural language input.

In one embodiment, the base machine learning model is a base LLM, which is loaded into the tenant cloud. The base LLM may have been trained outside of the tenant cloud based on prompts that provide natural language inputs, labeled outputs, a set of valid output content categories such as global content categories that may be used by different tenants, engagement feedback, and any other feedback on categorizing the natural language inputs provided by manual review or detected engagement. A custom LLM in the tenant cloud may trained based on prompts that provide natural language inputs, labeled outputs, valid output content categories for the tenant, engagement feedback, and any other feedback on categorizing the natural language inputs provided by manual review or detected engagement. Specific instructions, boundaries, and valid outputs may be included in the LLM prompts.

The custom LLM may then select a content category based on prompts that provide natural language inputs. For example, a custom LLM may receive user input "where can I get burritos nearby?," which was input into an application by a user, and determine that the user is searching for a Mexican Restaurant. For example, the input may be provided to a multi-purpose search or chat box on a user interface of a cloud application. Once the LLM has mapped the input to a "Mexican Restaurant," the content assembler may look for promotional content tagged with "Mexican" and "Restaurant," with content promoting establishments near the user ranked higher than content promoting establishments further from the user or alternatively ranking items in a different order for establishments within a threshold distance of the user. The content assembler may then select a particular item of promotional content to show to the user in response to the input, along with any special discounts available for the establishment.

In another example, a custom machine learning model may receive the user input "where can I get burritos nearby?", and the custom machine learning model may use an ontology where "burrito" is nested under both "Mexican" and "Restaurant." The custom machine learning model may then match the user input to promotional content tagged with "Mexican" and "Restaurant," with further filters or sorting based on factors such as distance from the user.

In one embodiment, a natural language processing tool may see input from a user as well as other users in a social tool where users interact with each other in one or more feeds about work, trips, food, vacations, and other places or events where goods or services are consumed. The natural language processing tool may determine that a post or a pattern of posts are about a particular category of goods or services for which promotional content is available. Based on determining that promotional content is available for the category of goods or services, the natural language processing tool may post the promotional content to the relevant feed.

Intelligently Selecting Content for Users

The custom ML model, a different ML model, or the content assembler may select a content item in the selected category to include as an instance of the content item is prepared for display to a user of the application. In an alternative embodiment, the custom ML model may receive input metadata describing the available content items and metrics about the items (engagement statistics for the tenant organization and/or for a specific user, tagged topics, weights, etc.), and the custom ML model may select a content item itself rather than a category of content items. If the custom ML model selects a category of content, the content assembler may select an individual item of content to instantiate and provide to the user.

In one example, if a custom ML model selects a category of "outdoor meetup location," a content assembler may filter content tagged with "outdoor" and "meetup location," and show outdoor meetup locations ordered based on criteria such as distance from the user, frequency of user engagement with the outdoor meetup location information, and/or a number of other users in the area of the outdoor meetup location.

Various suggestions may be provided for the mutual benefit of the organization using the cloud application and the organization offering products or services through promotional content. A non-limiting list of example promotional content includes, but is not limited to, content promoting restaurants, bars, coffee shops, clubs, dessert shops, clothing, electronics, office supplies, department stores, drugstores, flowers and gifts, groceries, luggage, souvenirs, taxis or ride sharing, rental cars, delivery services, health care, events, hotels, spas, airlines, educational classes, fitness classes, and/or social outings. Any item of promotional content may be delivered to a member of the organization based on the member's activity in the application, for example, to help the member make an efficient decision and/or to meet up with other members of the company. As described herein, this targeted promotional content may be delivered to the member of the organization without revealing the member's identity to the content provider.

Suggestions may also be provided in coordination with filters and other criteria provided through the application's interface. For example, a user may type into a text box "find Asian cuisine for a work event nearby at a 5-star restaurant," and a content assembler may look for promotional content tagged with the following characteristics: "restaurant," "5-star," "Asian cuisine," sorted by those nearest the current (home or traveling/hotel) zip code of the searching user, as determined from the user's profile in the tenant organization's data cloud. The tags may be maintained in a catalog about promotional content items and characteristics about the goods or services being promoted, and the characteristics may be mined from online review services such as those provided by Google® and Yelp®.

In one embodiment, the large language model suggests a particular category based on the user's actions, and multiple content items are available for the particular category. The content items may be refined based on characteristics, such as location of a promoted establishment relative to the user, user reviews of the promoted organization on social media (e.g., Google reviews and/or Yelp reviews), and/or past user activity from other users at the user's organization relative to the promoted organization and other organizations in the same category. For example, if users at a company interact with Starbucks® promotions with a first frequency and Dunkin Donuts® promotions with a second, lower frequency, the content assembler in the organization's private cloud may select Starbucks® promotions over Dunkin Donuts® promotions to match a coffee shop category for new users who have never been exposed to coffee shop promotions. In another embodiment, the content assembler may use a weighted randomization of promotions to ensure that lower weight promotions still receive some exposure and opportunity to increase in weight. In this embodiment, the weight of the promotion may be based on a variety of factors, including engagement rates of users at the organization using the cloud application and/or relative amounts paid per view by each content promoter, which may vary. In the latter scenario, content promoters paying more per view may be promoted or weighted over content promoters paying less per view.

Personalized Content Delivery Through Opaque Privacy Preserving Content Promotion Platform Referring back to FIG. 3, tenant applications 340 and 342 display the provided instances of content items to user devices 346, 348, 350, 352, and 354, respectively, based on the previously received user interactions from those devices. Users on those devices 346, 348, 350, 352, and 354 may engage with the content, for example, by viewing the content, keeping the content in view, selecting or clicking on the content, opening a page based on the content, and/or making a purchase based on the content. This engagement with the content may be tracked as content tracking data 312, tenant tracking data 322, and user tracking data 334.

In one example, tracking pixels embedded in the content items by content assembler 336 may be opened by user devices 346, 348, 350, 352, and 354. The tracking pixels, when opened, may trigger execution of a script that communicates data to tenant cloud 326, cloud services provider 308, and/or content provider 302, 304, or 306 in the form of user tracking data 334, tenant tracking data 322, and/or content tracking data 312. In the embodiment shown, content tracking data 312 is maintained on cloud services provider 308, but content tracking data 312 could also be maintained in a private cloud of content provider 302, 304, and 306.

User tracking data 334 may contain information about the user of user device 346, 348, 350, 352, or 354, which has been associated with the tracking pixel by content assembler 336 and is known only within tenant cloud 326. Tenant tracking data 322 may contain information about the tenant of tenant cloud 326, for example, if content assembler 336 obtained tracking pixel identifiers from cloud services provider 308. Cloud services provider 308 may, at the time the tracking pixel identifiers are obtained specific to the tenant of tenant cloud 326, store information mapping the assigned tracking pixel identifiers to the tenant of tenant cloud 326. Content tracking data 312 may contain information about which content has been prepared for viewing on behalf of cloud services provider 308 or any tenants of cloud services provider 308, including the tenant of tenant cloud 326. Content tracking data 312 may be obtained, for example, when cloud services provider 308 requests to create new tracking pixels for content in global content catalog 316 belonging to content providers 302, 304, and 306. Such requests to create new tracking pixels may be routed back to content providers 302, 304, and 306 to assign a tracking pixel identifier that is valid and sufficient for content providers 302, 304, and 306 to identify the content item provided from global content catalog 316 and cloud services provider 308 as a distributer of the content to content provider 302, 304, and 306.

In various embodiments, an organization may enable content promotion settings for members of the organization. Enabling content promotion settings may cause, by default, personalized content promotion for members of the organization while they are using one or more cloud applications. Members of the organization may, in a personalized settings interface, adjust personalized content promotion settings by enabling or disabling the collection and/or use of private application use information in selecting promotional content for display. Members of the organization may also enable or disable the display of promotional content altogether. In these various embodiments, a member may be opted in to receive targeted promotional content by default for the organization and may choose to opt out on a member-by-member basis.

In another embodiment, enabling the content promotion settings may cause, by default, no promotional content delivery or non-personalized content delivery to members of the organization. Then, the member of the organization may opt in to promotional content delivery on a member-by-member basis using the personalized settings interface. In these embodiments, a member may be opted out of receiving targeted promotional content by default for the organization and may choose to opt in on a member-by-member basis.

Regardless of default settings, an opted in member may receive promotional content in the application(s) such as content selected based on past input from the member and/or other members. An application or interaction handler may check to see that the member is opted in before passing the user's interaction input to a custom machine learning model such as a custom LLM.

In one embodiment, multiple users provide input to an application to indicate the users are looking for goods or services in the same or similar category, in nearby locations, at approximately the same time. The content assembler may detect, for a given user interaction, that other members of the organization are also looking for similar categories in similar locations at similar times, and suggest similar promotional content to each of the users.

In a specific example, the content assembler may detect that the users are searching for goods or services in a similar category in approximately the same place at approximately the same time and suggest not only suggest promotional content for the same goods or services to the users but also include names or other identifying information about other users to whom those goods or services have been promoted, and/or other users who have recently engaged in the same or similar promotions, and/or users who are currently located at a location where the promoted goods or services are being provided. Normally, this level of information would be impossible to obtain due to privacy preferences, but users may opt in to share this level of information with their own organization for the benefit of meeting up with colleagues from their own organization.

In one embodiment, location information of members is combined with information learned from interactions in the one or more applications. For example, a user may opt to share a GPS position of the user's mobile device with other members of the user's organization, in which case suggestions to the users may draw together users who are already close in physical proximity. In another example, a user's location may be determined when the user physically scans into a location through an application, such as scanning a QR code posted on a sign at Starbucks® or selecting a location that you plan to attend. In these examples, a first user's location may be used in determining suggestions for a second user, to promote interaction and shared experiences among users of the same organization. In yet another example, a user's location may be determined from a scanned receipt or entered expense report from an establishment, which may be consumed by an application for expense reimbursement purposes and also used by the content assembler to determine that the user is present or was recently present at the establishment.

In one embodiment, a user may opt in or opt out to sharing location, name details, job title details, company division details, home office details, and/or to be matched with other users based on any such details, via the personalized settings interface offered by a content assembler within the private cloud environment of the tenant organization. Via the opt in and opt out settings specific to different types of information shared by the content assembler, different members of the organization may be matched with targeted promotional content in a manner selected, desired, and guided by the member with full control over privacy boundaries.

In one embodiment, the content assembler receives location preference information from users. The location preference information may indicate some users prefer a location featured in an instance of a content item being prepared for display. The content assembler may also verify that such location preference information has been approved for sharing by the corresponding users. The location preference information relevant to the location may be used to prepare the instance of the content item. In one example, the content item is enriched with information about the user(s) who indicated that they prefer the location, who have engaged with the location, who have registered for an event or activity at the location, who have bought goods or services from the location, and/or who otherwise prefer the location featured in the content item. The enriched content item may then be displayed to the user with the additional information relevant to the content item from other users.

In one embodiment, depending on an organization's settings, a user may also opt in to share details with specific other organizations that have been whitelisted by the organization. For example, a particular user may elect to share their location, company information, and name with selected other companies via the content assembler, and the content assembler may send this information to the cloud services provider for sharing with other companies' content assemblers in other companies' private cloud environments. The cloud services provider may pass shared information between companies in this manner such that another user searching for restaurants nearby may see that a person from a different company is eating at a nearby restaurant. As a result, the people from different companies may elect to eat at the same restaurant and even be notified that each other is eating at the same restaurant. Users in sales divisions may find this feature useful for meeting up with people from other companies to discuss sales and partnership opportunities. In one embodiment, such sharing between tenant organizations is enabled only for a limited duration of time, such as one or two hours or days, before the sharing reverts to being disabled and must be enabled again to continue sharing.

Figure 4:
FIG. 4 illustrates a diagram of a user interface for a tenant organization's cloud application that provides targeted content without revealing user-specific information to the content provider.

FIG. 4 illustrates a diagram of a user interface 400 for a tenant organization's cloud application that provides targeted content without revealing user-specific information to the content provider. As shown, interface 400 includes a highlighted event 402 that a tenant, Acme, is hosting in San Francisco, as part of an event planning interface for connecting employees together in various regions. Interface 400 also includes promotional content 404, which may be selectable to open a page and trigger a script of a tracking pixel. Alternatively or additionally, a tracking pixel may be embedded in promotional content 404 so that loading interface 400 triggers storing indications that content 404 has been displayed to a user, to the tenant, and/or through the online services provider. As shown, promotional content 404 also includes image 406, which may be provided by a content provider selling goods or services and promoting content through the online services provider that provides the application providing interface 400 to tenants.

Interface 400 also includes other links 408, 410, 412, 414, and 416 for engaging with the highlighted event 402. Clicking other links 408, 410, 412, 414, and/or 416 may cause a tenant cloud hosting an application providing interface 400 to log, in a user profile of the user viewing interface 400, an increased interest in a category such as "athletics" and/or "running." Such increased interest may be used to select similar content for display by the application in the future.

Interface 400 also includes an option to connect with other Acme employees running the marathon. Selecting this link may cause interface 400 to show other users who have selected the "register now" link 416, or other users who have engaged with content item 404 or other content on interface 400.

FIG. 5 illustrates a diagram of another user interface 500 for a tenant organization's cloud application that provides targeted content without revealing user-specific information to the content provider. As shown, interface 500 includes a header 502 identifying the tenant, Acme, for which a member is traveling. Interface 500 also includes information about the member's travel itinerary 504, such as details about an upcoming flight. Interface 500 further includes information about restaurants 508, big bus tours 510, and employee connect or social opportunities 512 relating to the travel destination highlighted in details about the travel itinerary 504. The categories of additional opportunities 508, 510, and 512 may be accompanied by promotional content displayed in the regions shown, such as "Big Bus Tours Available-Visit Famous Places In New York," or promotional content that is generated upon selecting an opportunity 508, 510, or 512 to see a variety of sub-opportunities that match the various categories. Engagement with the sub-opportunities may be tracked to determine an order to show the sub-opportunities to a given user, as well as which sub-opportunities should be featured at the top level on interface 500 before drilling down into opportunities 508, 510, or 512.

Detecting Engagement with Content

Upon loading content associated with an opportunity, a tracking pixel or other tracking logic may be embedded in the loaded content or a process that runs when the content is loaded to trigger a script, such as a JavaScript script, that causes storage of indications that identified content has been displayed to a user, to the tenant, and/or through the online services provider. For example, the JavaScript on a page or content item may trigger a call to a server to retrieve related content, a pixel of blank content, or other additional content. The server may log the request to retrieve the additional content as well as the identifier used in the request as an indication that the page triggering the JavaScript call has been viewed by a user. The server may be located at the content provider that provided the initial content item, at the cloud services provider, or at the tenant organization. At the tenant organization, the indications may cause interests of the engaging user to be updated in a user's profile such that similar content is shown to the user on future occasions.

In one embodiment, once such engagement is detected, indications of the engagement may be stored for the content provider, the online services provider, and/or the tenant organization, with different levels of information accessible to each entity. The indication may identify whether such engagement occurred (or not), and, if so, the extent of such engagement (time spent, purchase(s) made, page(s) viewed, etc.). For example, a private indication of the engagement may be stored specific to a particular user and in association with a particular tracking identifier such that the private indication is accessible to the tenant organization but not to the content provider(s) outside the tenant organization, for example, the content provider which initially generated the content. The private indication might not even be accessible to the online services provider.

As another example, a private indication of the engagement may be stored specific to the tenant organization and in association with a particular tracking identifier such that the private indication is accessible the online services provider but not to the content provider(s). If the private indications identify multiple different tenants, these private indications may also be inaccessible to the tenant organizations.

As another example, an indication of the engagement may be stored so the content provider who provided the content can identify the instance of content for which the engagement occurred. If the content provider uses more than one online services provider, the indication may also identify which online services provider was used for the engagement. The indication might not identify the tenant organization or any users of the tenant organization, if the tenant organization and/or users have opted to keep this information private from the content provider.

In one embodiment, privacy is preserved through content consumption by users. By not revealing the tenant identity or the user identity to the content provider, the cloud services provider may generate a tracking pixel unique to the cloud services provider but not known to map to any particular user of the cloud services. In this manner, users within a company can consume content promoted on the applications without concern that the content providers will learn about their activities. Additionally, in one embodiment, the cloud services provider is not actually aware of the users consuming content in the tenant environment because such user-specific information is tracked inside the tenant environment, inaccessible to the cloud services provider and the content providers. This provides an extra layer of assurance and protection for the privacy of the users in the tenant organization.

In one embodiment, feedback is provided on the content items in terms of which content items are shown to users and which content items are selected or further engaged with by the users and the probability that the content items are further engaged with when shown to users, without knowing which users are being exposed to the content items. In this manner, the content providers can see, via tracking pixels specific to the cloud services provider, which instances of content items have been shown, which instances of content items have been further engaged with, and which instances of content items have not been further engaged with. Content items that do not receive frequent engagement may be retired from the catalog and replaced by content items that receive more frequent engagement, even without knowing the users engaging with the content items.

In one embodiment, based on the indication stored in the tenant cloud, a user preference is generated for the content category selected for which content was displayed and engaged with. The user preference may be stored for use by the custom machine learning model in additional iterations of selecting content categories based on user interactions with application(s) in the cloud environment, so that users continue to see content they are more likely to engage with based on content they have engaged with in the past.

Figure 2:
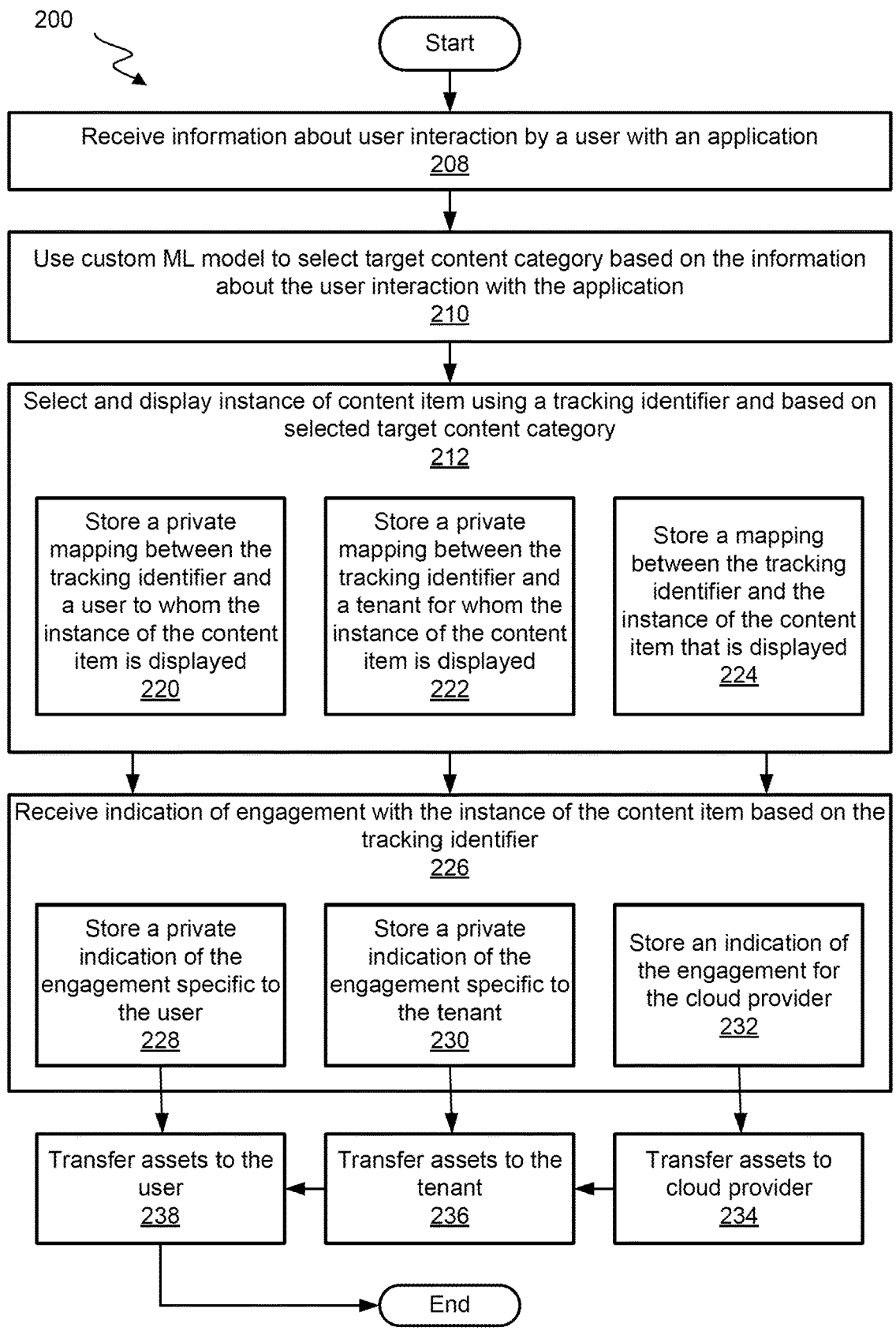
FIG. 2 illustrates a flow chart of a process for transferring assets in exchange for consuming targeted content without revealing user-specific information to the content provider.

Transferring Assets to Internal Individuals from a Content Provider without Revealing Identities of the Internal Individuals FIG. 2 illustrates a process 200 for a process for transferring assets in exchange for consuming targeted content without revealing user-specific information to the content provider. As shown, process 200 begins with block 208, where information is received by a tenant cloud about a user interaction by a user with an application. For example, the application may send the information about the user interaction to an interaction handler, which determines whether and where to pass along the information within the tenant cloud. In block 210, the cloud application or interaction handler may pass that information to the custom ML model for use in selecting a target content category based on the information about the user interaction with the application. In block 212, based on a selected target content category from the ML model, a content assembler selects and displays an instance of the content item using a tracking identifier.

Once the content is assembled for viewing, the tracking identifier may be stored in association with any number of mappings. In block 220, a private mapping is stored between the tracking identifier and a user to whom the instance of the content item is displayed. This private mapping may be stored within the tenant cloud in a manner that is inaccessible to the cloud services provider and/or the content providers. In block 222, a private mapping is stored between the tracking identifier and a tenant for whom the instance of the content item is displayed. This private mapping may be stored within a cloud of the cloud services provider in a manner that is inaccessible to the content providers. In block 224, a mapping is stored between the tracking identifier and the instance of the content item that is displayed. This mapping may be used by the content provider that provided the content item to see that the content item is being delivered without information about which user or tenant is receiving the delivered content.

In block 226, the tenant cloud, the online services provider, and/or the content provider may receive an indication of engagement with the instance of the content item based on the tracking identifier. In block 228, a private indication of the engagement is stored that is specific to the user. This private indication may be stored within the tenant cloud in a manner that is inaccessible to the cloud services provider and/or the content providers. In block 230, a private indication of the engagement is stored that is specific to the tenant. This private indication may be stored within a cloud of the cloud services provider in a manner that is inaccessible to the content providers. In block 232, an indication of the engagement is stored for or specific to the cloud provider. This indication may be used by the content provider that provided the content item to see that the content item has received engagement without information about which user or tenant is engaging with the content item. Even if the content provider embeds tracking pixel(s) in the content item, the tracking pixels can only be specific to the online services provider because the content provider has no knowledge of the tenant organizations served by the content provider and no knowledge of which users are engaging with content at those tenant organizations.

In block 234, based on the indication stored in block 232, the content provider may transfer assets to the cloud provider as a result of the engagement. Such a transfer may be accomplished, for example, by transferring funds to a target bank account, and/or by changing ownership of assets on a blockchain. If using blockchain, receipt of the engagement indication may trigger execution of a smart contract tied to evaluation of the engagement. Upon verification of engagement, the smart contract may automatically trigger re-assignment of ownership to the cloud services provider for up to an agreed-upon amount of assets that were allocation for promotional content.

Regardless of the form of transfer, a communication may be sent to the online services provider to notify the online services provider that the transfer has occurred. In the case of blockchain, the communication may be triggered as part of the smart contract.

Then, in block 236, as a result of the engagement verified in block 230 and the transfer from block 234, the online services provider may, in turn, transfer assets to the tenant. This transfer may also be accomplished in any manner (e.g., bank account and/or blockchain). Regardless of the form of transfer, a communication may be sent to the tenant organization to notify the tenant organization that the transfer has occurred. In the case of blockchain, the communication may be triggered as part of a smart contract between the tenant and the online services provider when the tenant agrees to include promotional content items in cloud applications from the online services provider.

Some tenant policies may not further distribute these assets to the user. In the example shown, based on the verified engagement in block 228 and the transfer in block 236, the tenant organization transfers assets to the user in block 238. This transfer may also be accomplished in any manner (e.g., bank account and/or blockchain). Regardless of the form of transfer, a communication may be sent to the user to notify the user that the transfer has occurred. In the case of blockchain, the communication may be triggered as part of a smart contract between the user and the tenant that is triggered when the user agrees to show promotional content on the user's cloud applications. The entire process of engagement verification, transfer, and communication between the content provider, the online services provider, and the tenant organization may be fully automated up to an agreed-upon asset transfer amount by the content provider for content that has been verified as engaged to a level requested as part of the agreed-upon asset transfer amount.

Referring back to FIG. 3, content providers 302, 304, and 306 use content tracking data 312 to verify engagement with displayed content items, for example, by detecting that tracking pixels embedded in the content items have been opened by end users. Content providers 302, 304, and 306 may also verify that the content items are opened at different times by different devices, based on information that may be passed with the tracking pixel identifier as part of opening the content item. Content providers 302, 304, and 306 may configure asset manager 314 to automatically transfer assets to cloud services provider 308 upon determining that the engagements have occurred with the content items.

Cloud services provider may similarly verify that engagements have occurred using tenant tracking data 322, and, for verified engagements of the tenant of tenant cloud 326, may automatically transfer the assets from content providers 302, 304, and 306 to the tenant of tenant cloud 326. Asset manager 344 of tenant cloud 326 may similarly verify, based on user tracking data 334, that content engagement has occurred from specific users based on user tracking data 334. Upon verifying that such engagement occurred, asset manager 344 may transfer assets to individual users of tenant cloud applications 340 and 342 of tenant cloud 326. For example, funds may be transferred from content providers to the cloud services provider based on the engagement of all tenants of the cloud services provider, and a portion of those funds may be transferred to individual tenants of the cloud services provider based on the engagement from each tenant, and a portion of the portion of funds may be transferred to individual users of the individual tenants based on the engagement from each user.

In one embodiment, the content provider compensates the cloud services provider for engagement or conversion related to the content provided to the cloud services customers or tenants, without knowing which tenants contributed to the engagements or conversions. The cloud services provider may then distribute payments from the content provider to individual tenants after matching tracking pixel identifiers with individual tenant identifiers, without knowing which users contributed to the engagements or conversions for each tenant.

The tenant organization may then distribute payments from the cloud services provider to individual users after matching tracking pixel identifiers with individual user identifiers. The cloud services provider and/or the tenant organization may take a cut or percentage of the payment before passing the payment along downstream, as a fee for coordinating the service.

In one embodiment, the cut or payment taken by the cloud services provider depends on a subscription plan of the tenant organization, where subscription plans with higher fees to the cloud services provider result in lower percentages taken from the content provider's payment and subscription plans with lower fees to the cloud services provider result in higher percentages taken from the content provider's payment and subscription plans. Non-limiting example percentages include 50% for the cloud services provider, 50% for the tenant organization, and 0% for the viewing user; 33% for the cloud services provider, 33% for the tenant organization, and 33% for the viewing user; and 70% for the cloud services provider, 0% for the tenant organization, and 30% for the viewing user.

Computer System Architecture

Figure 6:
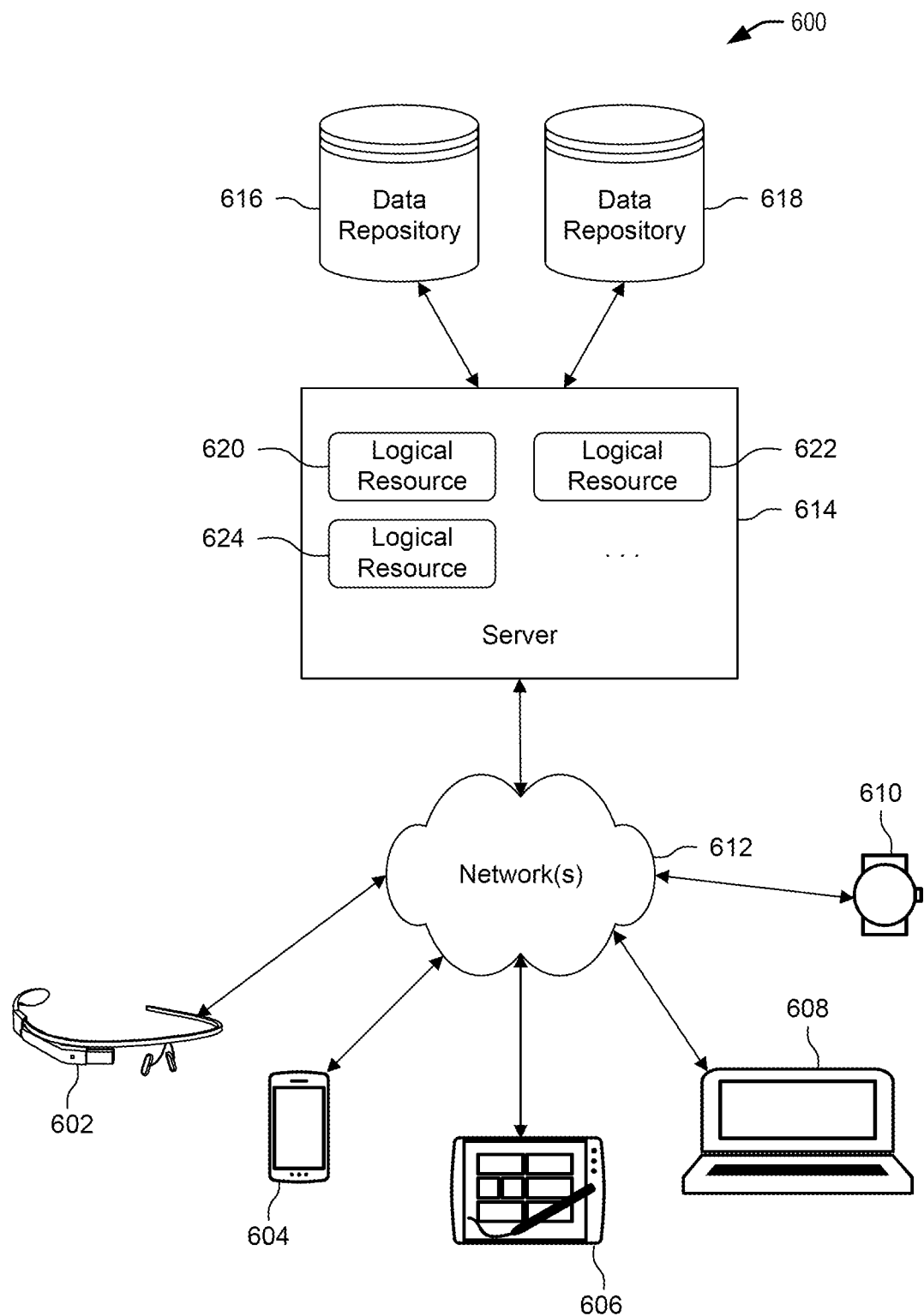
FIG. 6 depicts a simplified diagram of a distributed system for implementing certain aspects.

FIG. 6 depicts a simplified diagram of a distributed system 600 for implementing an embodiment. In the illustrated embodiment, distributed system 600 includes one or more client computing devices 602, 604, 606, 608, and/or 610 coupled to a server 614 via one or more communication networks 612. Clients computing devices 602, 604, 606, 608, and/or 610 may be configured to execute one or more applications.

In various aspects, server 614 may be adapted to run one or more services or software applications that enable techniques for providing personalized content in applications without revealing personal details to content providers.

In certain aspects, server 614 may also provide other services or software applications that can include non-virtual and virtual environments. In some aspects, these services may be offered as web-based or cloud services, such as under a Software as a Service (SaaS) model to the users of client computing devices 602, 604, 606, 608, and/or 610. Users operating client computing devices 602, 604, 606, 608, and/or 610 may in turn utilize one or more client applications to interact with server 614 to utilize the services provided by these components.

In the configuration depicted in FIG. 6, server 614 may include one or more components 620, 622 and 624 that implement the functions performed by server 614. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, 608, and/or 610 for techniques for providing personalized content in applications without revealing personal details to content providers in accordance with the teachings of this disclosure. A client device may provide an interface that enables a user of the client device to interact with the client device. The client device may also output information to the user via this interface. Although FIG. 6 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 612 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 612 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 614 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 614 can include one or more virtual machines running virtual operating systems, or other computing architectures involving virtualization such as one or more flexible pools of logical storage devices that can be virtualized to maintain virtual storage devices for the server. In various aspects, server 614 may be adapted to run one or more services or software applications that provide the functionality described in the foregoing disclosure.

The computing systems in server 614 may run one or more operating systems including any of those discussed above, as well as any commercially available server operating system. Server 614 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 614 may include one or more applications to analyze and consolidate data feeds and/or event updates received from users of client computing devices 602, 604, 606, 608, and/or 610. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 614 may also include one or more applications to display the data feeds and/or real-time events via one or more display devices of client computing devices 602, 604, 606, 608, and/or 610.

Distributed system 600 may also include one or more data repositories 616, 618. These data repositories may be used to store data and other information in certain aspects. For example, one or more of the data repositories 616, 618 may be used to store information for techniques for providing personalized content in applications without revealing personal details to content providers. Data repositories 616, 618 may reside in a variety of locations. For example, a data repository used by server 614 may be local to server 614 or may be remote from server 614 and in communication with server 614 via a network-based or dedicated connection. Data repositories 616, 618 may be of different types. In certain aspects, a data repository used by server 614 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 616, 618 may also be used by applications to store application data. The data repositories used by applications may be of different types such as, for example, a key-value store repository, an object store repository, or a general storage repository supported by a file system.

In one embodiment, server 614 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 7:
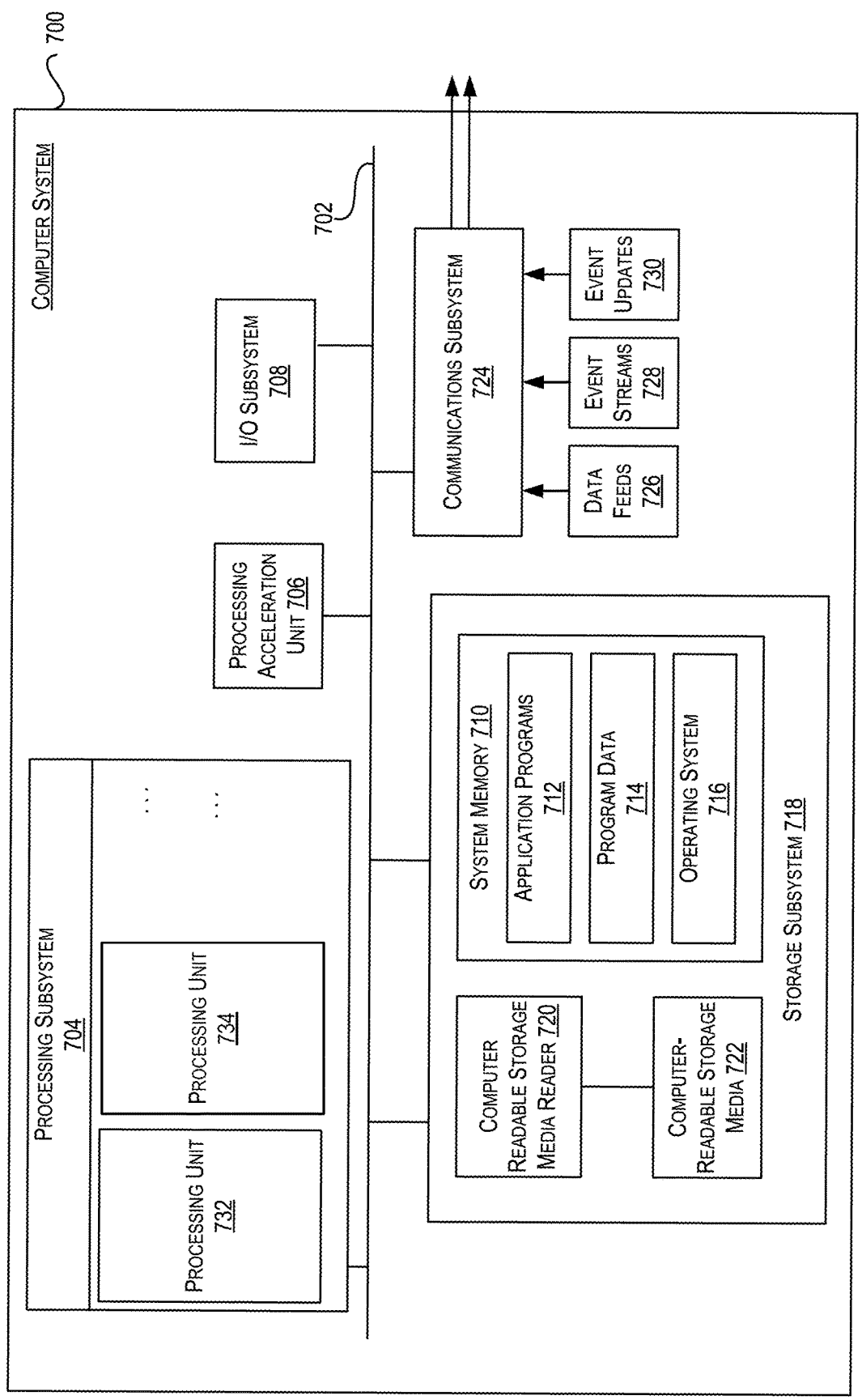
FIG. 7 illustrates an example computer system that may be used to implement certain aspects.

FIG. 7 illustrates an exemplary computer system 700 that may be used to implement certain aspects. For example, in some aspects, computer system 700 may be used to implement any of the system 100 for enriching log records with fields from other log records in structured format as shown in FIG. 1 and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to transmit a response to a user regarding the inquiry for a Chabot.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:
    loading a base machine learning model to a cloud environment that is private to a tenant organization;
    generating a custom machine learning model specific to the tenant organization at least in part by training the base machine learning model in the cloud environment that is private to the tenant organization, wherein the base machine learning model is trained to match user interactions of users with one or more applications in the cloud environment to content categories of a plurality of content categories of content provided by one or more content providers outside the tenant organization;
    using the custom machine learning model to select the content categories for which to provide instances of content items to the users based on the user interactions; wherein a particular content category is selected based at least in part on processing, by the custom machine learning model, natural language from a particular user interaction of a particular user with a particular application;
    selecting a particular instance of a particular content item of a catalog comprising a plurality of available content items to provide to the particular user based at least in part on the particular content category;
    embedding a script in the particular content item that, when loaded, triggers a call to a server to inform the server that the particular instance of the particular content item was loaded;
    storing a first mapping private to the tenant organization that indicates the particular instance of the particular content item is being provided to the particular user, wherein the particular instance of the particular content item is identified using a particular tracking identifier;
    causing storage of a second mapping accessible to at least one of the one or more content providers outside the tenant organization that indicates the particular instance of the particular content item is being provided to a user of a cloud services provider; wherein the second mapping does not reveal an identity of the particular user and does not reveal an identity of the tenant organization;
    based at least in part on the script informing the server that the particular instance of the particular content item was loaded:
        determining, using the first mapping private to the tenant organization, that the particular instance of the particular content item is being provided to the particular user; and
        triggering storage, accessible to the cloud environment that is private to the tenant organization, of a private indication that the particular content item was loaded by the particular user and in association with the particular tracking identifier for the particular instance of the particular content item; wherein the private indication is accessible to the tenant organization but not to the one or more content providers outside the tenant organization; and
    based at least in part on the private indication, generating, for the particular user, a user preference for the particular content category, wherein the user preference is stored for use by the custom machine learning model in one or more additional iterations of selecting content categories based on user interactions with the one or more applications in the cloud environment;
    based at least in part on the second mapping, receiving a modification to the catalog that removes one or more of the plurality of available content items.

2. The computer-implemented method of claim 1, further comprising:
    based at least in part on detecting an engagement with the particular content item by the particular user:
        triggering storage of an opaque indication of the engagement specific to the cloud services provider and in association with the particular tracking identifier; wherein the opaque indication is accessible to the one or more content providers outside the tenant organization; and wherein the modification is further based at least in part on the opaque indication of the engagement specific to the cloud services provider.

3. The computer-implemented method of claim 1, wherein the base machine learning model is a base large language model that is trained outside the cloud environment based at least in part on:
  prompts that provide first natural language inputs and a set of global content categories for content available to the tenant organization and one or more other tenant organizations, and
  feedback on categorizing the first natural language inputs to one or more content categories of the set of global content categories;
  wherein the custom machine learning model is a custom large language model that is trained within the cloud environment based at least in part on:
  prompts that provide second natural language inputs and the plurality of content categories, and
  feedback on categorizing the second natural language inputs to one or more content categories of the plurality of content categories.

4. The computer-implemented method of claim 1, further comprising:
  receiving content configuration input from the particular user, wherein the content configuration input opts in to receiving content promoted by the one or more content providers;
  wherein the natural language from the particular user interaction with the particular application is provided to the custom machine learning model based at least in part on the content configuration input opting in to receiving content promoted by the one or more content providers.

5. The computer-implemented method of claim 2, further comprising:
  based at least in part on the opaque indication of the engagement specific to the cloud services provider, triggering:
  a first automated asset transfer from a particular content provider of the one or more content providers to the cloud services provider, and
  a first automated communication from the particular content provider to the cloud services provider that associates the first automated asset transfer with the particular tracking identifier;
  based at least in part on the first automated communication from the particular content provider to the cloud services provider, triggering:
  a second automated asset transfer from the cloud services provider to the tenant organization, and
  a second automated communication from the cloud services provider to the tenant organization that associates the second automated asset transfer with the particular tracking identifier.

6. The computer-implemented method of claim 5, further comprising:
  based at least in part on the second automated communication from the particular content provider to the cloud services provider, triggering:
  a third automated asset transfer from the tenant organization to the particular user, and
  a third automated communication from the tenant organization to the particular user that associates the third automated asset transfer with user activity relating to the particular application.

7. The computer-implemented method of claim 1, further comprising:
  receiving location preference information from a plurality of users, wherein the location preference information indicates that one or more users of the plurality of users prefer a particular location featured in the particular instance of the particular content item;
  enriching the particular instance of the particular content item with information about at least one of the one or more users that prefer the particular location featured in the particular instance of the particular content item; and
  after enriching the particular instance, causing display of the particular instance of the particular content item to the particular user.

8. A computer-program product comprising one or more non-transitory machine-readable storage media, including stored instructions configured to cause a computing system to perform a set of actions including:
  loading a base machine learning model to a cloud environment that is private to a tenant organization;
  generating a custom machine learning model specific to the tenant organization at least in part by training the base machine learning model in the cloud environment that is private to the tenant organization, wherein the base machine learning model is trained to match user interactions of users with one or more applications in the cloud environment to content categories of a plurality of content categories of content provided by one or more content providers outside the tenant organization;
  using the custom machine learning model to select the content categories for which to provide instances of content items to the users based on the user interactions; wherein a particular content category is selected based at least in part on processing, by the custom machine learning model, natural language from a particular user interaction of a particular user with a particular application;
  selecting a particular instance of a particular content item of a catalog comprising a plurality of available content items to provide to the particular user based at least in part on the particular content category;
  embedding a script in the particular content item that, when loaded, triggers a call to a server to inform the server that the particular instance of the particular content item was loaded;
  storing a first mapping private to the tenant organization that indicates the particular instance of the particular content item is being provided to the particular user, wherein the particular instance of the particular content item is identified using a particular tracking identifier;
  causing storage of a second mapping accessible to at least one of the one or more content providers outside the tenant organization that indicates the particular instance of the particular content item is being provided to a user of a cloud services provider; wherein the second mapping does not reveal an identity of the particular user and does not reveal an identity of the tenant organization;
  based at least in part on the script informing the server that the particular instance of the particular content item was loaded:
    determining, using the first mapping private to the tenant organization, that the particular instance of the particular content item is being provided to the particular user; and
    triggering storage, accessible to the cloud environment that is private to the tenant organization, of a private indication that the particular content item was loaded by the particular user and in association with the particular tracking identifier for the particular instance of the particular content item; wherein the private indication is accessible to the tenant organization but not to the one or more content providers outside the tenant organization; and based at least in part on the private indication, generating, for the particular user, a user preference for the particular content category, wherein the user preference is stored for use by the custom machine learning model in one or more additional iterations of selecting content categories based on user interactions with the one or more applications in the cloud environment;

based at least in part on the second mapping, receiving a modification to the catalog that removes one or more of the plurality of available content items.

9. The computer-program product of claim 8, wherein the set of actions further includes:
based at least in part on detecting an engagement with the particular content item by the particular user:
triggering storage of an opaque indication of the engagement specific to the cloud services provider and in association with the particular tracking identifier; wherein the opaque indication is accessible to the one or more content providers outside the tenant organization; and wherein the modification is further based at least in part on the opaque indication of the engagement specific to the cloud services provider.

10. The computer-program product of claim 8, wherein the base machine learning model is a base large language model that is trained outside the cloud environment based at least in part on:
prompts that provide first natural language inputs and a set of global content categories for content available to the tenant organization and one or more other tenant organizations, and
feedback on categorizing the first natural language inputs to one or more content categories of the set of global content categories;
wherein the custom machine learning model is a custom large language model that is trained within the cloud environment based at least in part on:
prompts that provide second natural language inputs and the plurality of content categories, and
feedback on categorizing the second natural language inputs to one or more content categories of the plurality of content categories.

11. The computer-program product of claim 8, wherein the set of actions further includes:
receiving content configuration input from the particular user, wherein the content configuration input opts in to receiving content promoted by the one or more content providers;
wherein the natural language from the particular user interaction with the particular application is provided to the custom machine learning model based at least in part on the content configuration input opting in to receiving content promoted by the one or more content providers.

12. The computer-program product of claim 9, wherein the set of actions further includes:
based at least in part on the opaque indication of the engagement specific to the cloud services provider, triggering:
a first automated asset transfer from a particular content provider of the one or more content providers to the cloud services provider, and
a first automated communication from the particular content provider to the cloud services provider that associates the first automated asset transfer with the particular tracking identifier;
based at least in part on the first automated communication from the particular content provider to the cloud services provider, triggering:
a second automated asset transfer from the cloud services provider to the tenant organization, and
a second automated communication from the cloud services provider to the tenant organization that associates the second automated asset transfer with the particular tracking identifier.

13. The computer-program product of claim 12, wherein the set of actions further includes:
based at least in part on the second automated communication from the particular content provider to the cloud services provider, triggering:
a third automated asset transfer from the tenant organization to the particular user, and
a third automated communication from the tenant organization to the particular user that associates the third automated asset transfer with user activity relating to the particular application.

14. The computer-program product of claim 8, wherein the set of actions further includes:
receiving location preference information from a plurality of users, wherein the location preference information indicates that one or more users of the plurality of users prefer a particular location featured in the particular instance of the particular content item;
enriching the particular instance of the particular content item with information about at least one of the one or more users that prefer the particular location featured in the particular instance of the particular content item; and
after enriching the particular instance, causing display of the particular instance of the particular content item to the particular user.

15. A system comprising:
one or more processors;
one or more non-transitory computer-readable media storing instructions, which, when executed by the system, cause the system to perform a set of actions including:
loading a base machine learning model to a cloud environment that is private to a tenant organization;
generating a custom machine learning model specific to the tenant organization at least in part by training the base machine learning model in the cloud environment that is private to the tenant organization, wherein the base machine learning model is trained to match user interactions of users with one or more applications in the cloud environment to content categories of a plurality of content categories of content provided by one or more content providers outside the tenant organization;
using the custom machine learning model to select the content categories for which to provide instances of content items to the users based on the user interactions; wherein a particular content category is selected based at least in part on processing, by the custom machine learning model, natural language from a particular user interaction of a particular user with a particular application;
selecting a particular instance of a particular content item of a catalog comprising a plurality of available content items to provide to the particular user based at least in part on the particular content category;
embedding a script in the particular content item that, when loaded, triggers a call to a server to inform the server that the particular instance of the particular content item was loaded;
storing a first mapping private to the tenant organization that indicates the particular instance of the particular content item is being provided to the particular user, wherein the particular instance of the particular content item is identified using a particular tracking identifier;
causing storage of a second mapping accessible to at least one of the one or more content providers outside the tenant organization that indicates the particular instance of the particular content item is being provided to a user of a cloud services provider; wherein the second mapping does not reveal an identity of the particular user and does not reveal an identity of the tenant organization;
based at least in part on the script informing the server that the particular instance of the particular content item was loaded:
determining, using the first mapping private to the tenant organization, that the particular instance of the particular content item is being provided to the particular user; and
triggering storage, accessible to the cloud environment that is private to the tenant organization, of a private indication that the particular content item was loaded by the particular user and in association with the particular tracking identifier for the particular instance of the particular content item; wherein the private indication is accessible to the tenant organization but not to the one or more content providers outside the tenant organization; and
based at least in part on the private indication, generating, for the particular user, a user preference for the particular content category, wherein the user preference is stored for use by the custom machine learning model in one or more additional iterations of selecting content categories based on user interactions with the one or more applications in the cloud environment;
based at least in part on the second mapping, receiving a modification to the catalog that removes one or more of the plurality of available content items.

16. The system of claim 15, wherein the set of actions further includes:
based at least in part on detecting an engagement with the particular content item by the particular user:
triggering storage of an opaque indication of the engagement specific to the cloud services provider and in association with the particular tracking identifier; wherein the opaque indication is accessible to the one or more content providers outside the tenant organization; and wherein the modification is further based at least in part on the opaque indication of the engagement specific to the cloud services provider.

17. The system of claim 15, wherein the base machine learning model is a base large language model that is trained outside the cloud environment based at least in part on:
prompts that provide first natural language inputs and a set of global content categories for content available to the tenant organization and one or more other tenant organizations, and
feedback on categorizing the first natural language inputs to one or more content categories of the set of global content categories;
wherein the custom machine learning model is a custom large language model that is trained within the cloud environment based at least in part on:
prompts that provide second natural language inputs and the plurality of content categories, and
feedback on categorizing the second natural language inputs to one or more content categories of the plurality of content categories.

18. The system of claim 15, wherein the set of actions further includes:
receiving content configuration input from the particular user, wherein the content configuration input opts in to receiving content promoted by the one or more content providers;
wherein the natural language from the particular user interaction with the particular application is provided to the custom machine learning model based at least in part on the content configuration input opting in to receiving content promoted by the one or more content providers.

19. The system of claim 16, wherein the set of actions further includes:
based at least in part on the opaque indication of the engagement specific to the cloud services provider, triggering:
a first automated asset transfer from a particular content provider of the one or more content providers to the cloud services provider, and
a first automated communication from the particular content provider to the cloud services provider that associates the first automated asset transfer with the particular tracking identifier;
based at least in part on the first automated communication from the particular content provider to the cloud services provider, triggering:
a second automated asset transfer from the cloud services provider to the tenant organization, and
a second automated communication from the cloud services provider to the tenant organization that associates the second automated asset transfer with the particular tracking identifier.

20. The system of claim 15, wherein the set of actions further includes:
receiving location preference information from a plurality of users, wherein the location preference information indicates that one or more users of the plurality of users prefer a particular location featured in the particular instance of the particular content item;
enriching the particular instance of the particular content item with information about at least one of the one or more users that prefer the particular location featured in the particular instance of the particular content item; and
after enriching the particular instance, causing display of the particular instance of the particular content item to the particular user.

21. The computer-implemented method of claim 1, wherein embedding the script in the particular content item comprises embedding JavaScript on a page; wherein the call to the server is a call to retrieve related content that, when processed, informs the server that the particular instance of the particular content item was loaded to cause the call to be triggered.

22. The computer-implemented method of claim 1, further comprising:

selecting another particular instance of another particular content item of the catalog as modified based at least in part on the particular content category;

embedding another script in the other particular content item that, when loaded, triggers another call to the server to inform the server that the other particular instance of the other particular content item was loaded;

based at least in part on the other script informing the server that the other particular instance of the other particular content item was loaded:

triggering storage, accessible to the cloud environment that is private to the tenant organization, of another private indication that the other particular content item was loaded by the particular user and in association with another particular tracking identifier for the other particular instance of the other particular content item; wherein the other private indication is accessible to the tenant organization but not to the one or more content providers outside the tenant organization.

23. The computer-program product of claim 8, wherein embedding the script in the particular content item comprises embedding JavaScript on a page; wherein the call to the server is a call to retrieve related content that, when processed, informs the server that the particular instance of the particular content item was loaded to cause the call to be triggered.

24. The computer-program product of claim 8, wherein the set of actions further includes:

selecting another particular instance of another particular content item of the catalog as modified based at least in part on the particular content category;

embedding another script in the other particular content item that, when loaded, triggers another call to the server to inform the server that the other particular instance of the other particular content item was loaded;

based at least in part on the other script informing the server that the other particular instance of the other particular content item was loaded:

triggering storage, accessible to the cloud environment that is private to the tenant organization, of another private indication that the other particular content item was loaded by the particular user and in association with another particular tracking identifier for the other particular instance of the other particular content item; wherein the other private indication is accessible to the tenant organization but not to the one or more content providers outside the tenant organization.

25. The system of claim 15, wherein embedding the script in the particular content item comprises embedding JavaScript on a page; wherein the call to the server is a call to retrieve related content that, when processed, informs the server that the particular instance of the particular content item was loaded to cause the call to be triggered.

26. The system of claim 15, wherein the set of actions further includes:

selecting another particular instance of another particular content item of the catalog as modified based at least in part on the particular content category;

embedding another script in the other particular content item that, when loaded, triggers another call to the server to inform the server that the other particular instance of the other particular content item was loaded;

based at least in part on the other script informing the server that the other particular instance of the other particular content item was loaded:

triggering storage, accessible to the cloud environment that is private to the tenant organization, of another private indication that the other particular content item was loaded by the particular user and in association with another particular tracking identifier for the other particular instance of the other particular content item; wherein the other private indication is accessible to the tenant organization but not to the one or more content providers outside the tenant organization.

\* \* \* \* \*